(12) United States Patent
Arnold et al.

(10) Patent No.: US 7,770,157 B2
(45) Date of Patent: Aug. 3, 2010

(54) SYSTEM AND METHOD FOR IMPROVING VIRTUAL MACHINE PERFORMANCE USING AN OFFLINE PROFILE REPOSITORY

(75) Inventors: Matthew R. Arnold, Ossining, NY (US); Vadakkedathu T. Rajan, Briarcliff Manor, NY (US); Adam Welc, Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 11/199,455

(22) Filed: Aug. 8, 2005

(65) Prior Publication Data
US 2007/0033578 A1 Feb. 8, 2007

(51) Int. Cl.
*G06F 9/44* (2006.01)
(52) U.S. Cl. .................. 717/130; 717/131; 717/151
(58) Field of Classification Search .............. 717/151, 717/130, 131
See application file for complete search history.

(56) References Cited
U.S. PATENT DOCUMENTS
6,275,981 B1 * 8/2001 Buzbee et al. ............... 717/158

OTHER PUBLICATIONS

S. M. Sandya, Jazzing up JVMs with off-line profile data: does it pay?, Aug. 2004, ACM SIGPLAN Notices, vol. 39, Issue 8, pp. 72-80.*

Matthew Arnold, Michael Hind, Barbara G. Ryder, Online feedback-directed optimization of Java, Nov. 4-8, 2002, ACM SIGPLAN Notices, vol. 37, Issue 11, pp. 111-129.*

John Whaley, Joeq: A Virtual Machine and Compiler Infrastructure, Jun. 12, 2003, IVME'03, pp. 58-66.*

Matthew Arnold, Michael Hind, and Barbara G. Ryder, An Empirical Study of Selective Optimization, Book Series: Lecture Notes in Computer Science, 2001, Springer Berlin/Heidelberg pp. 49-67.*

B. Alpern, C. R. Attanasio, J. J. Barton, et al., The Jalapeño virtual machine, IBM Systems Journal, vol. 39, Issue 1 (Jan. 2000), pp. 211-238.*

* cited by examiner

*Primary Examiner*—Hyung S Sough
*Assistant Examiner*—Kimberly Jordan
(74) *Attorney, Agent, or Firm*—Jose Gutman; Fleit Gibbons Gurman Bongini & Bianco P.I

(57) ABSTRACT

A system, method, and computer readable medium, for automatically improving performance of, and optimizing, a program based on on-line profile data of the program and profile data (302) collected across multiple runs of the program and stored in a persistent off-line repository (114). The method includes executing a program in an execution environment. Profile data (302) is collected for the program across multiple runs thereof. The performance of the program is improved, such as by optimization of the program, based on on-line profile data of the executing program and the collected profile data in the persistent off-line repository.

18 Claims, 12 Drawing Sheets

| Program 1 | $T_1$ | · · · · · · · · · | | $T_n$ |
|---|---|---|---|---|
| $M_1$ | 1 | | | 5 |
| $M_2$ | 4 | | | 7 |
| $M_3$ | 2 | | | 1 |
| · | | | | |
| · | | | | |
| · | | | | |
| · | | | | |
| · | | | | |
| · | | | | |
| $M_n$ | 10 | | | 8 |

FIG. 4

Input: $C_j$, $S_j$, runsExecutingM(t)

$F_j$ = Strat$_j$ = 0 for all j // No future running time iterate backward in time, $t=t_{max}$ .. 0 for each optimization level $j=K$ .. 1

// Optimal future time from time t forward
    // if no compilation performed at time t
    // Divide exe time by t to scales for
    // average performance
    exeTimeThisUnit = ($S_j$ *runsExecutingM(t+1))
    minCost = $F_j$ + exeTimeThisUnit = t
    action = { } // How to achieve minCost for each optimization level h such that $h > j$
      // Optimal running time if M complied at h
      // at time t Divide exe time by t to scale
      // for average performance
      compilationTime = $C_h$ *runsExecutingM(t)
      exeTimeThisUnit = $S_h$ *runsExecutingM(t+1)
      cost = $F_h$ + (compilationTime + exeTimeThisUnit)/t
      if cost < minCost
      minCost = cost
      action = compile from level j to level h
              at time $t_j$
    // We now have the optimal strategy for time t
    // forward when starting at level j
    $F_j$ = minCost
    Strat$_j$ = Strat$_j$ ∪ action Output: $F_0$, Strat$_0$

SYSTEM AND METHOD FOR IMPROVING VIRTUAL MACHINE PERFORMANCE USING AN OFFLINE PROFILE REPOSITORY

STATEMENT REGARDING FEDERALLY SPONSORED RESEARCH OR DEVELOPMENT

This invention was made with Government support under Contract No. PERCS NBCH 30390004 awarded by DARPA. The Government has certain rights in this invention.

FIELD OF THE INVENTION

The present invention generally relates to the field of execution environments, and more particularly relates to optimizing a program while executing in an execution environment.

BACKGROUND OF THE INVENTION

Virtual machine technology has progressed significantly over the last several years, largely due to the success of the Java™ programming language, and more recently the C# language. The dynamic nature of these languages has spurred particular interest in the area of dynamic compilation and adaptive optimization. Most of the production Java Virtual Machines available today contain advanced adaptive optimization systems that monitor and optimize the program as it executes, and these systems have had a substantial impact on performance. These systems have used profiling information in multiple ways to improve performance. First, the frequently executed parts of the program were identified to determine where optimization efforts should be focused. Second, profiling was used to perform online, i.e. while the program is executing, feedback-directed optimizations. Some adaptive optimization systems have used profiling information during execution to improve the quality of generated code, giving them the potential to outperform a static compilation model. Conventional virtual machines normally discard a program's profile data at the end of execution.

Additionally, traditional off-line profiling has assumed a clear distinction between training runs, where profile data is collected, and production runs, where profile data is exploited. A virtual machine does not have the luxury of this distinction; every run is both a production run and a training run, thus a virtual machine must be prepared to adapt to continuously changing profile data.

Another problem is that systems that have performed optimization based on off-line profile data required a manual training step, which circumvents the automation of an automatic virtual machine. This manual training step drastically reduces the chance that such a technique will be used by a typical developer. For example, profile training data is used to optimize an application while the application is not running. Developers have to manually optimize and tweak the application for a set of known conditions. After the application has been optimized using the profile training data, the program is then conventionally executed as described above. Additionally, these systems assume a clear distinction between training and production runs and therefore cannot efficiently adapt to continuously changing profile data.

Because the program is optimized during training only for a given set of training conditions, when these conditions change in an execution environment, the program executes less than optimal. Another manual training optimization has to be performed to further optimize the program. Additionally, these training systems assume a clear distinction between training and production runs and therefore cannot efficiently adapt to continuously changing profile data.

Other systems have annotated Java byte-code to identify hot priority methods that should be optimized immediately at higher optimization levels. In addition to requiring a training step, this work does not generalize to programs that have a wide range of inputs. Their technique specifies that methods are always optimized at a fixed optimization level. For example, if a program has two inputs, one short running, and one long running their fixed strategy would perform poorly, either over-compiling for the short running programs, or under-compiling in the long-running ones.

Additional systems have performed ahead-of-time compilation, or static compilation of Java, where compilation is performed prior to program execution, to try and avoid the overhead caused by performing compilation at runtime. This approach has a number of disadvantages; first, it changes the execution model, introducing security concerns by eliminating the process of byte code verification. Modifying the compiled code on the disk circumvents all of Java's safety guarantees. Second, static compilation involves a number of technical challenges for language with features such as dynamic class loading and reflection. Finally, static compilation requires compiling and installing the application thereby preventing the technology from being used in many real world situations where automation is key.

Therefore a need exists to overcome the problems with the prior art as discussed above.

SUMMARY OF THE INVENTION

Briefly, in accordance with the present invention, disclosed are a system, method, and computer program product on an electronic device for optimizing a program based on on-line profile information and profile information collected across multiple runs of the program in an execution environment. The method comprises executing at least one program in an execution environment. Profile data is collected for the at least one executing program across multiple runs thereof, in a persistent off-line repository. Performance of the at least one executing program is improved based on on-line profile data of the at least one executing program and the collected profile data in the persistent off-line repository.

In another embodiment of the present invention system for collecting information for optimizing performance of an executing program is disclosed. The system comprises a persistent memory and an information processing unit that is communicatively coupled to the persistent memory. The system further comprises a program executing environment that is communicatively coupled to the persistent memory and the information processing unit. A profile data collector is communicatively coupled to the program executing environment for collecting on-line profile data associated with a program executing in the program executing environment. An on-line repository is communicatively coupled to the profile data collector for storing on-line profile data collected during at least one execution run of a program executing in the program executing environment.

The system also includes a persistent off-line repository that is communicatively coupled to the profile data collector and resides in the persistent memory for persistently storing the collected on-line profile data associated with the program. A profile data analyzer is communicatively coupled to the off-line repository for analyzing the stored profile data in the off-line repository to determine at least one on-line optimization strategy for the program. An optimizer is communicatively coupled to the off-line repository and the on-line repository for optimizing performance of the program based on the collected on-line profile data associated with the program and the determined at least one on-line optimization strategy for the program.

In yet another embodiment of the present invention, a computer readable medium includes computer instructions for optimizing a program based on on-line profile data and profile data collected across previous runs of the program. The instructions on the computer readable medium include instructions for executing at least one program in an execution environment. Profile data is collected for the at least one executing program across multiple runs thereof, in a persistent off-line repository. Performance of the at least one executing program is improved based on on-line profile data of the at least one executing program and the collected profile data in the persistent off-line repository.

An advantage of the foregoing embodiments of the present invention is that optimization of a program is automatic and transparent to the user. Interaction by the user is not required for optimization to occur. Additionally, optimization is based on a combination of current on-line profile data and off-line profile data that has been collected from previous runs of the program.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4 illustrates an exemplary program entry in the off-line repository of FIG. 2, according to an embodiment of the present invention;

FIG. 12 is a listing of code representing an optimizing algorithm according to an embodiment of the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to an embodiment, overcomes problems with the prior art by storing and utilizing profile data collected across multiple runs of a program in combination with current on-line profile data for optimizing an executing program.

Figure 1:
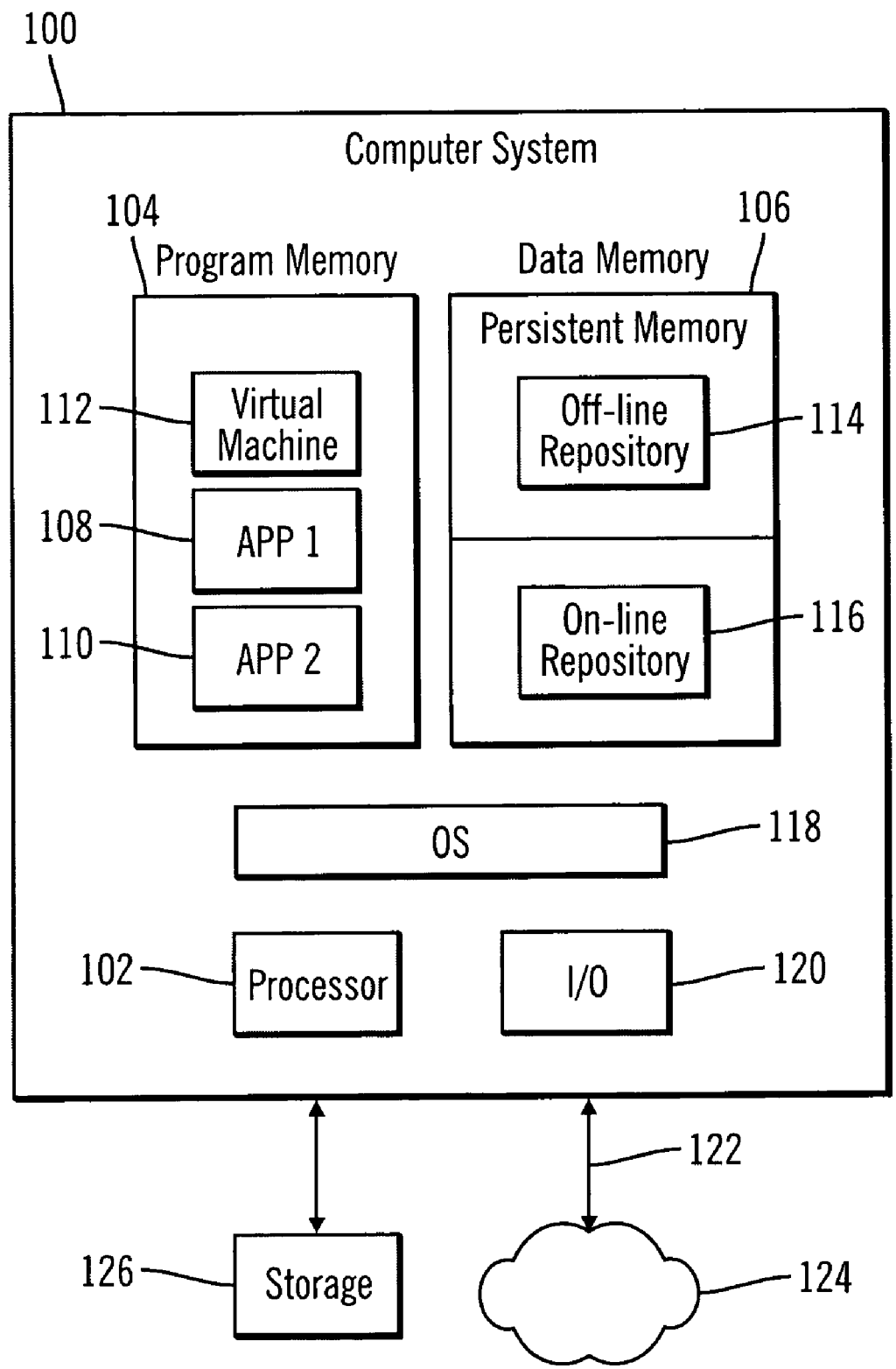
FIG. 1 is a block diagram illustrating a computer system according to an embodiment of the present invention.

According to an embodiment of the present invention, as shown in FIG. 1, an exemplary computer system 100 is illustrated. FIG. 1 shows a computer system 100 comprising an information processing unit 102, e.g. a processor, that is communicatively coupled to a program memory 104 and a data memory 106. The processor 102 processes instructions, performs calculations, and manages the flow of information through the computer system 100. The processor 102, in one embodiment, is also communicatively coupled to a removable media drive (not shown), such as a CD-ROM drive, floppy drive, or the like, that is compatible with a computer readable medium (not shown) such as a CD-ROM or a floppy, that comprises programs and data for use by the computer system 100.

The program memory 102 includes programs for the computer system 100, for example, applications 108, 110 that are running or waiting to be executed. An execution environment 112, for example, is also included in the program memory 104. The execution environment will be discussed on greater detail below. The data memory 106 includes an off-line repository 114 and an on-line repository 116. The off-line repository resides in a section of the data memory 106 that is persistent, that is, the data residing in the persistent memory section of the data memory 104 is not lost when power is turned off from the computer system 100. The data memory 106, for example, is non-volatile RAM, a hard disk drive, or the like. The off-line repository 114 and the on-line repository 116 will be discussed in greater detail below.

The computer system 100 also includes an operating system platform 118 and glue software (not shown). The operating system platform 118 manages resources, such as the data stored in data memory 106, the scheduling of tasks, and processes the operation of the applications 108, 110 in the program memory 104. The operating system platform 118 also manages various input/output interfaces and devices represented by the input/output block 120. For example, in one embodiment, an input/output interface/device is a graphical display interface (not shown), a user input interface (not shown) that receives inputs from a keyboard (not shown) and a pointing device (not shown), and communication network interfaces (not shown) for communication with a network link 122. Additionally, the operating system platform 118 also manages many other basic tasks of the computer system 100 in a manner well known to those of ordinary skill in the art.

Glue software (not shown) may include drivers, stacks, and low level application programming interfaces (API's) and provide basic functional components for use by the operating system platform 118 and by compatible applications that run on the operating system platform 118 for managing communications with resources and processes in the computer system 100.

The network link 122 links the computer system 100 to a network 124. The network 124, for example, is a local area network, World Wide Web, 802.11x network, or the like. The computer system 100 is also communicatively coupled to a storage device 126, for example, a CD-ROM, external hard drive, USB drive, floppy drive, Flash memory, or the like. The computer system 100 reads and/or writes data to the storage device 126.

Figure 2:
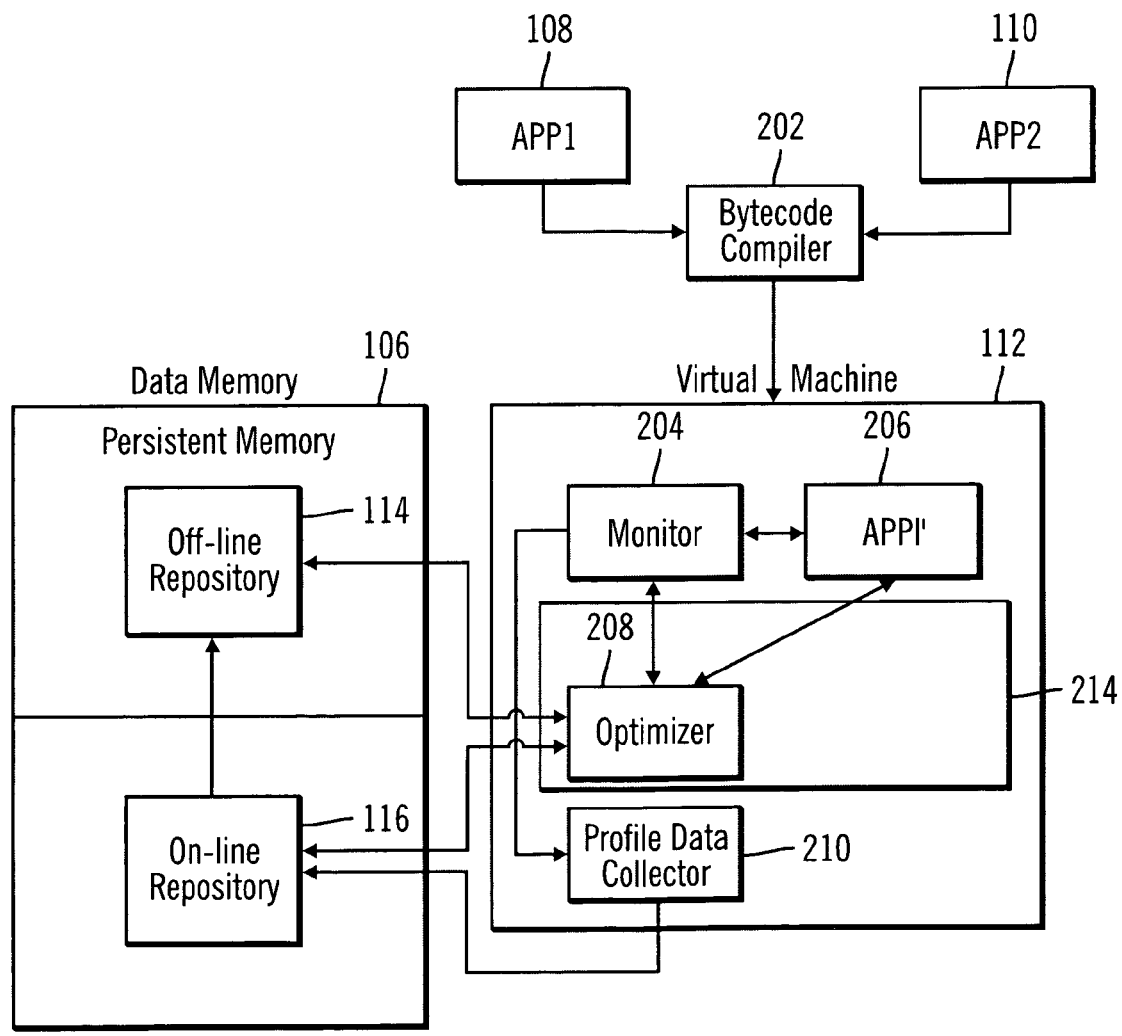
FIG. 2 is a block diagram illustrating a more detailed view of the execution environment shown in FIG. 1 and its relationship to other components of the computer system of FIG. 1.

FIG. 2 shows a more detailed view of the program memory 104 in FIG. 1 and the relationship between the components of the program memory 104 and the data memory 106. In one embodiment, the program memory 104 further includes a bytecode compiler 202 for converting Java source code into Java bytecodes, which are read in and compiled by the virtual machine 112. The application1 108, in one embodiment, is written in a human readable language such as Java and the bytecode compiler 202 compiles the application1 108 so that the application1 108 can run in the executing environment 112. Hereinafter the execution environment 112, will be referred to as virtual machine, however, in alternative embodiments, the execution environment 112 is a virtual machine, JAVA virtual machine environment, a middleware system, or the like.

The virtual machine 112 includes a monitor 204 that monitors the running application1' 206 and is communicatively coupled to an adaptive optimizing system 214 that comprises, but is not limited to, an optimizer 208. The adaptive optimizing system 214 may also include an interpreter (not shown). The monitor 204 is also communicatively coupled to a profile data collector 210. The monitor 204 monitors the running application1' 206 and acts as a window into the running application1' 206 for the profile data collector 210 to collect data associated with the running application1' 206. The monitor 204 also communicates with the adaptive optimizing system 214 so that the monitor 204 can keep track of any optimization of the running application1' 206.

The adaptive optimizing system 214 is communicatively coupled to the off-line repository 114 and the on-line repository 116 so that it is able to base optimization decisions on information stored in the off-line repository 114 and the on-line repository 116. The adaptive optimizing system 214 is also communicatively coupled to the running application1' 206 for optimizing the running application1' 206 based on information stored in the off-line and on-line repositories 114, 116. The optimizer 208 optimizes the compilation of the application1' 206.

The profile data collector 210 is communicatively coupled to the on-line repository 116 for storing on-line profile data collected from the running application1' 206 in the on-line repository. The on-line repository 116 is communicatively coupled to the off-line repository 114 so that the on-line profile data stored in the on-line repository can be aggregated into the off-line repository 114, which is persistent, i.e. the data remains in the off-line repository 114 until it is deleted.

Figure 3:
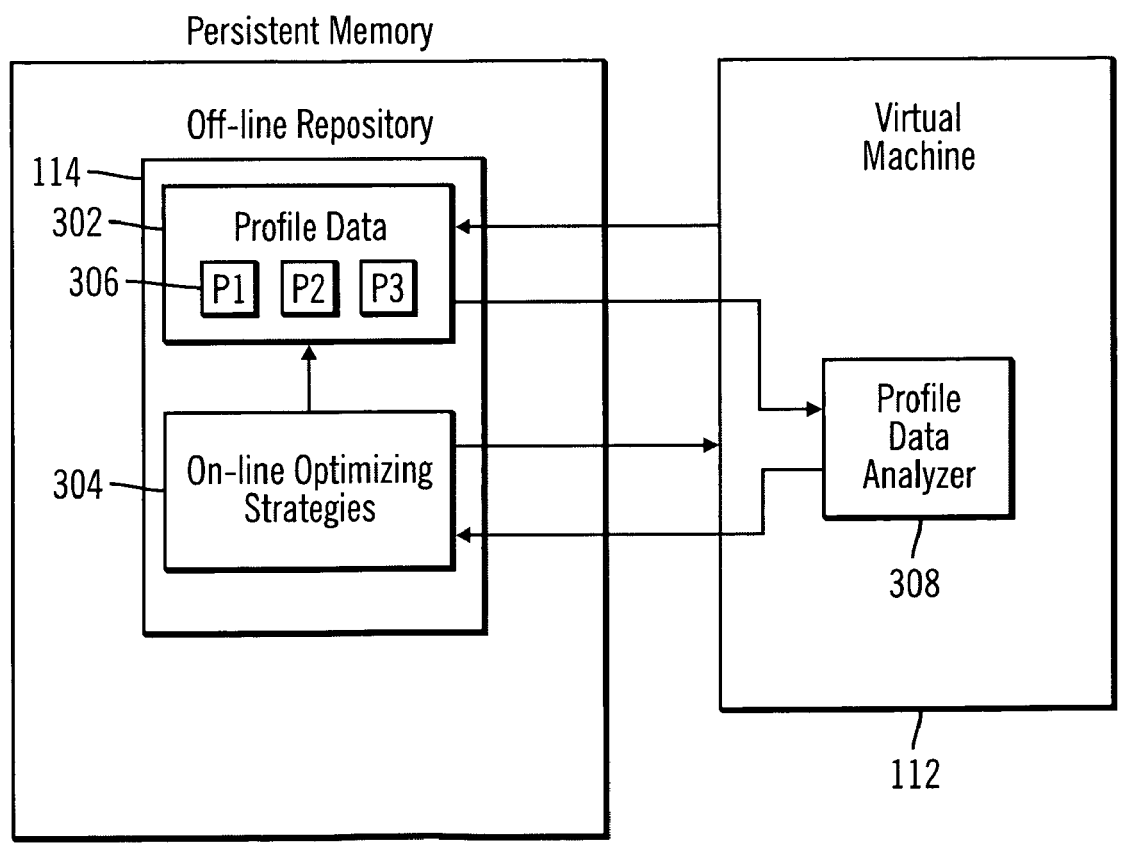
FIG. 3 is a block diagram illustrating a more detailed view the off-line repository of FIG. 2 and its relationship to the execution environment of FIG. 1.

FIG. 3 shows a more detailed view of the off-line repository 114 and the relationship between the virtual machine 112 and the off-line repository 114. As stated above, the off-line repository resides in a persistent memory section of the data memory 106. Therefore, the data stored in the off-line repository is not lost when the virtual machine exits. In an exemplary embodiment, the off-line repository 114 includes profile data 302 and online optimizing strategies 304. The profile data 302 is comprised of profile data that has been collected on-line (i.e. while a program is executing) across multiple runs of a program and merged or aggregated into the off-line repository 114. The profile data 302, in one embodiment, is but not limited to time spent in various methods of a program; dominant call targets at virtual call sites; and/or intraprocedural control flow paths.

The profile data 302, in one embodiment, includes a separate entry 306 for each program P1, P2, P3 that has ran in the virtual machine 112. However, in another embodiment, the profile data 302 includes an entry 306 comprising only a selected group of programs or merged program data. In one embodiment of the present invention, a program is defined by the fully qualified signature of the main ( ) method that is executed to start execution of the program. In another embodiment, the location of the class file residing on a storage medium can be added in the entry 306 to avoid merging multiple programs whose main ( ) method share the same fully qualified class name. The program entry 306 will be discussed in greater detail below. Maintaining an off-line repository 114 is advantageous because it gives the execution environment 112 the ability to map information and remember profile data across multiple program executions. Therefore, the virtual machine 112 does not have to start learning all over again when a program executes.

In one embodiment, the on-line optimizing strategies 304 are suggestions to the adaptive optimizing system 214 regarding the actions it should take at run time. The off-line repository 114 is communicatively coupled to the virtual machine 112 for communicating the on-line optimization strategies 304 to the adaptive optimizing system 210 (FIG. 1). The on-line optimizing strategies 304 will be discussed in greater detail below. The virtual machine 112, further includes a profile data analyzer 308 that decides how optimization of a program should be performed based on the data stored in the off-line repository 114. In an alternative embodiment, the profile data analyzer 308 is located outside of the virtual machine 112 and optionally outside of the computer system 100.

One advantage of the present invention is that the optimization decision making logic is centrally located in the profile data analyzer 308. Centrally locating this logic in the profile data analyzer 308 avoids the problem having the optimization logic distributed throughout various components of the computer system 100, which creates a system that is difficult to understand and debug. Additionally, dispersing the optimization logic throughout the components of the system and not centrally locating it limits the ability to plug in new decision making policies. An additional advantage of the present invention is that including a separate profile data analyzer 308 allows the analysis of the profile data 302 to be performed at any time, such as by an off-line agent that runs in the background. The analysis can also be performed on-line as will be discussed in greater detail below.

The off-line repository 114 is updated with profile data stored in the on-line repository 116 (FIG. 1) residing in the data memory 106 (FIG. 1). In an alternative embodiment, the virtual machine 112 is communicatively coupled with the off-line repository 114, as shown in FIG. 3, and includes a repository (not shown) for storing current on-line profile data of an executing program for updating the profile data 302 of the off-line repository 114. The off-line repository 114 is also communicatively coupled to the profile data analyzer 308 so that profile data 302 can be analyzed by the profile data analyzer 308 to determine on-line optimizing strategies 304, which are stored in the off-line profile repository 114.

Figure 4:
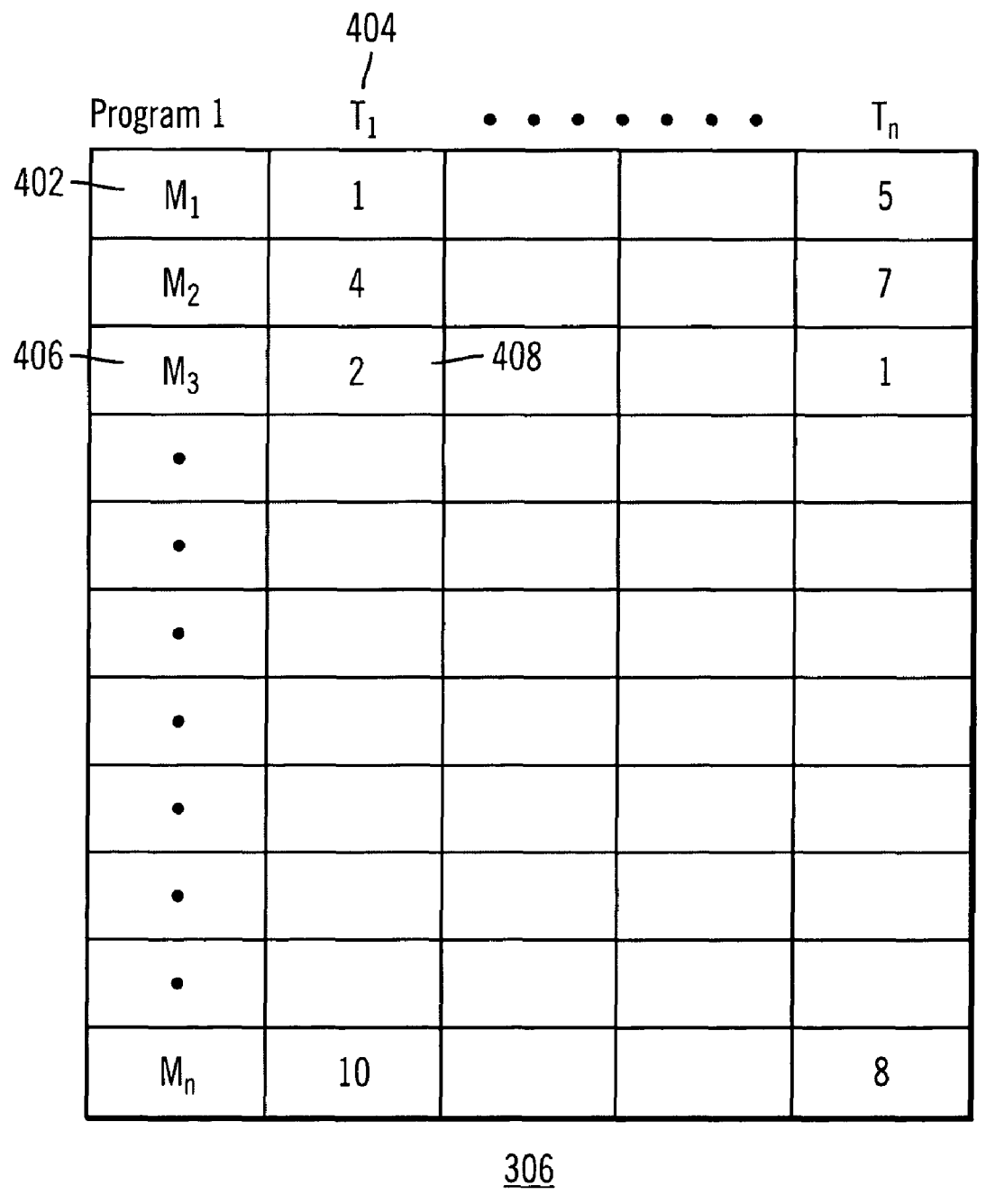

FIG. 4 illustrates an exemplary program entry 306 in the off-line repository 114. The program entry 306 represents the number of program executions for which a particular method executed for a specific time before exiting. For example, a method M1 402 ran for period of T1 404 one time and method M3 406 ran for a period of T1 408 for two times. It should be noted that present invention is not limited to recording profile data in this manner. As stated above, the time spent in dominant call targets at virtual call sites, intraprocedural control flow paths, or the like can also be represented in a program entry. Also, profile data for all of the methods or the most frequently ran methods (hot methods) of a program can be collected and stored in the off-line profile repository 114.

Figure 5:
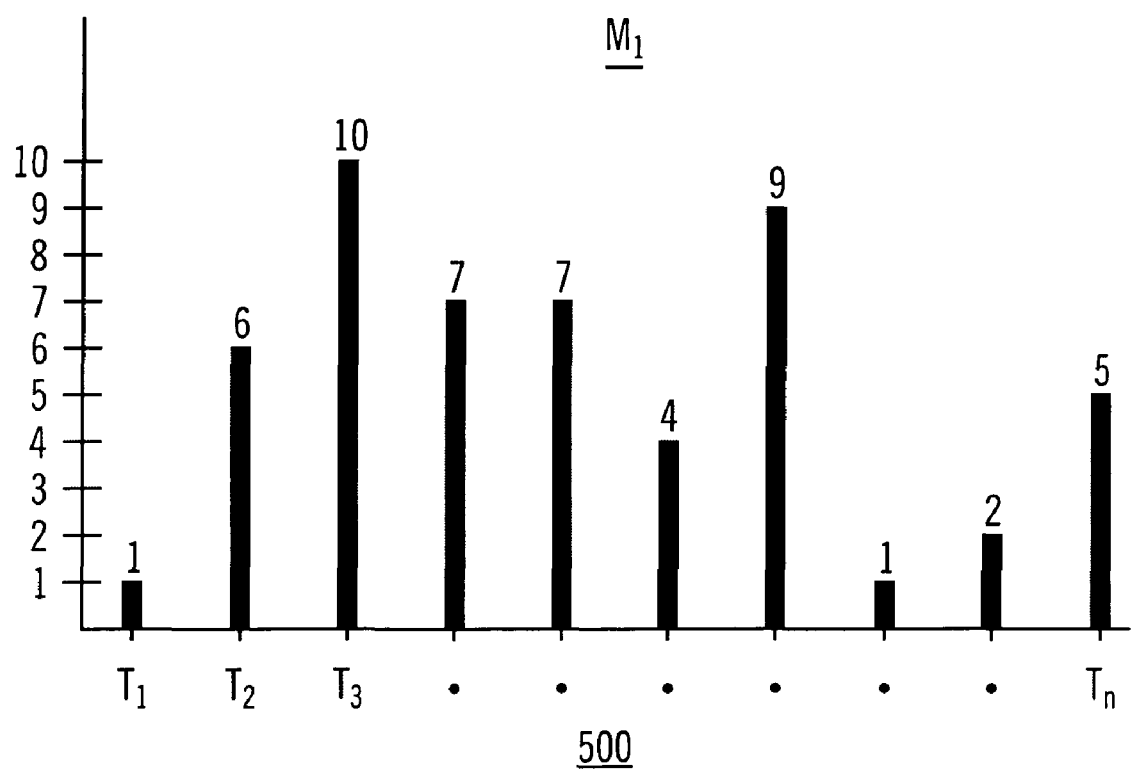
FIG. 5 is a histogram representing the data in the program entry of FIG. 4, according to an embodiment of the present invention.

Because programs have multiple inputs which can drastically affect the running time of the program, as well as the distribution of time spent in the various methods of the program, a histogram of running times, one embodiment of the present invention maintains a histogram for each method in the off-line repository 114. FIG. 5 illustrates a histogram 500 calculated from the profile data stored in the off-line profile data repository 114. The histogram 500 is another way of representing the data in the program entry 306 of FIG. 4. For example, method M1 302 ran for a period of T1 one time and for a period of T3 ten times. In one embodiment, the time spent in methods is recorded using timer-based sampling, thus method samples is the unit of time in this embodiment. However, any unit of time can be used such as cycle count, wall-clock time, or the like.

Figure 6:
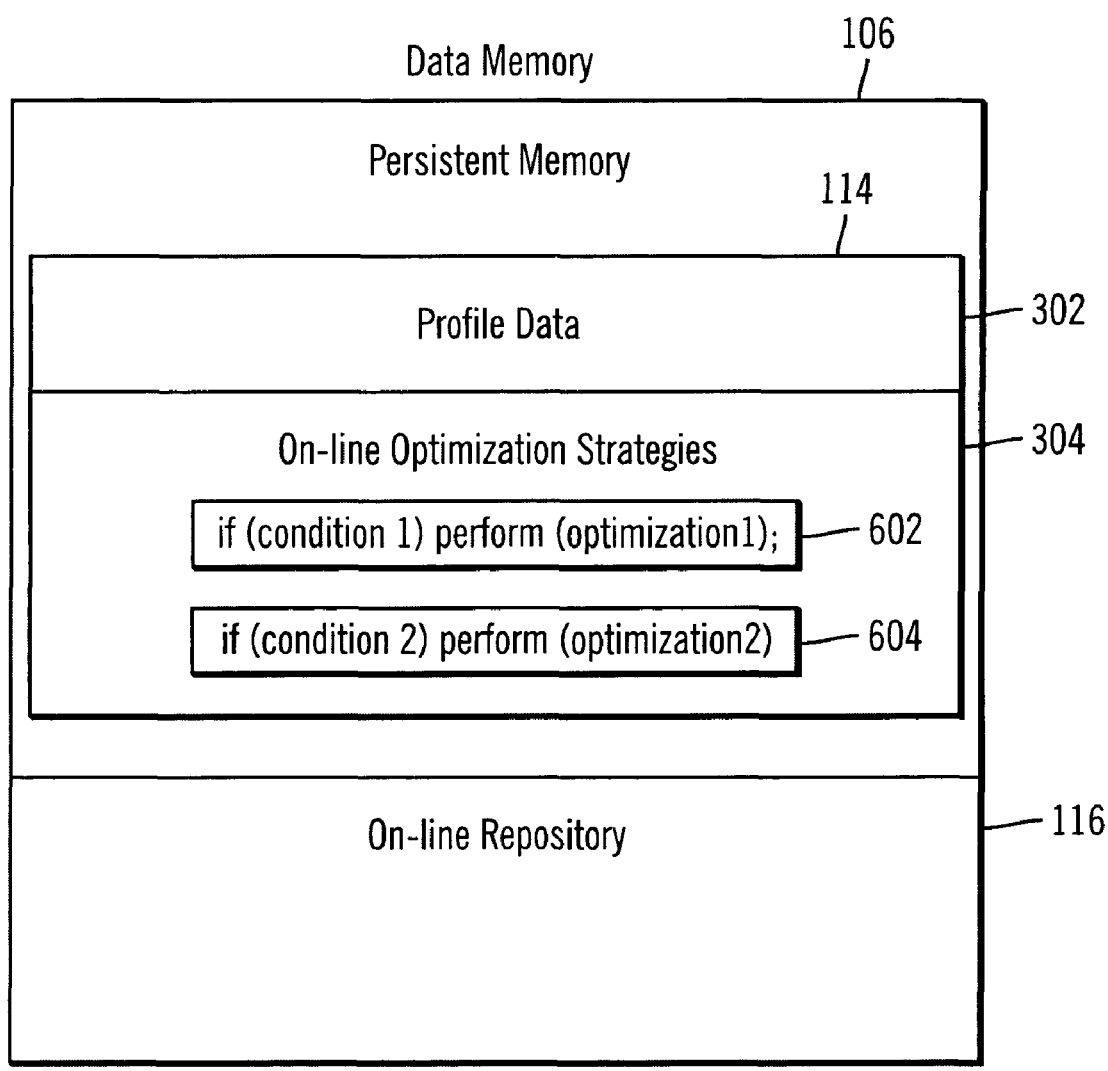
FIG. 6 is a block diagram illustrating a more detailed view of the data memory of FIG. 1.

FIG. 6 illustrates a more detailed view of the on-line optimization strategies 304. In one embodiment, the on-line optimization strategies 304 are strategies for selective optimization. Selective optimization is the process of determining what parts of a program should be optimized, when optimization should be performed, and what level of optimization should be used. The on-line optimization strategies 304 are the output of the profile data analyzer 308 and notify the adaptive optimizing system 214 how to optimize based on what the adaptive optimizing system 214 sees at run time. FIG. 6 shows the on-line optimizing strategies 304 as a list of conditionalized optimization actions. For example, a first on-line optimization strategy 602 states if (condition 1) then perform (optimization action 1) and a second on-line optimization strategy 604 states if (condition 2) then perform (optimization action 2). This general structure provides power and flexibility regarding solutions that can be constructed by the profile analysis phase of the present invention, allowing the analysis to construct optimization plans that exploit the profile data from the repository together with the on-line profiling that will occur during a future execution. In one embodiment, the on-line strategies include but are not limited to instructions for the execution environment 112 to optimize a method earlier or later than usual or to inline a particular call target at a virtual call site.

The format of the on-line optimization strategies 304 comprises, for example, a set of tuples such as {(time, optimization level)}. Each tuple corresponds to a method being compiled by the adaptive optimizing system 214. Time is the amount of time the method needs to execute and optimization level is the optimization level to be used. For example, the strategy {(1, 2), (3, 4)} directs the adaptive optimizing system 214 to compile at optimization level 2 after the first sample and optimization level 4 after the third sample of a program.

Figure 7:
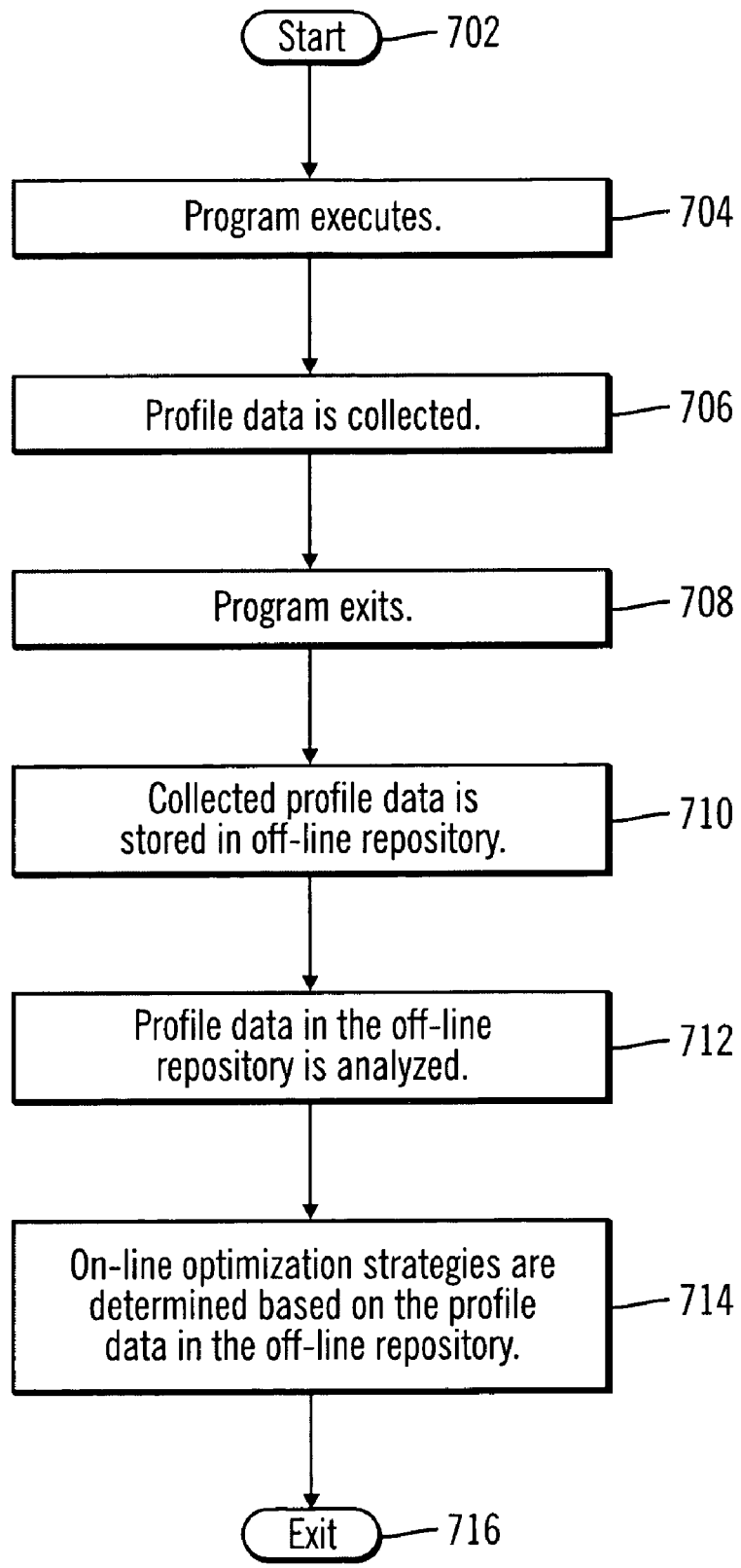
FIG. 7 is an operational flow diagram illustrating a process of determining on-line optimization strategies.

FIG. 7 is an operational flow diagram showing the process of determining on-line optimization strategies. The operational flow diagram of FIG. 7 begins with step 702 and flows directly to step 704. A program, at step 704, starts to execute in the virtual machine 112. As the program is executing, the profile data collector 308 collects on-line profile data, at step 706, for each method that runs during the execution of the program. As the on-line profile data is collected it is stored for example, in an on-line repository 116, which resides in the data memory 106. Alternatively, in another embodiment, the on-line profile data is stored in a repository (not shown) in the virtual machine 112. When the program is finished executing it then exits, at step 708. The collected on-line profile data is then stored (or merged if there is existing data), at step 710, in the off-line repository 114. The profile data analyzer 308 then analyzes the collected profile data, at step 712, that is stored in the off-line repository 114 and determines, at step 714, on-line optimization strategies for optimizing the related program. The on-line optimization strategies 304 are stored in the off-line repository 114. The control flow then exits at step 716

As stated above, the profile analysis analyzer 308 constructs an on-line optimization strategy 304 based on the profile data 302 in the off-line repository 114. In one embodiment, this analysis is performed when the off-line repository 114 is being read or written to. In another embodiment, the analysis is performed by an off-line profile data analyzer or by using a background process that runs when the processor 102 is idle. However, for users who prefer not to have additional background processes running on their system, another embodiment of the present invention performs the profile data analysis step 712 at the time the off-line repository 114 is updated by the virtual machine 112, i.e. when the collected on-line data is merged into the existing data of the off-line repository 114, step 710. The on-line optimization strategies 304 are determined by the profile data analyzer 308 while the virtual machine 112 is still active.

Another advantage of the present invention is that the amount of overhead occurring while the virtual machine 112 is still running is reduced during the profiling of a program. For example, in one embodiment of the present invention profile data is collected, at step 606 of FIG. 6, for hot methods instead of all the methods. Additionally, creating the on-line optimization strategies from scratch whenever new profile data is added to the off-line profile repository is not necessary. For example, the on-line optimization strategies only need to be adjusted to account for the new information recently added to the off-line repository 114.

In another embodiment, the analysis of the stored profile data 302 is an iterative solution procedure so that the previous on-line optimization strategy for a method is used as the initial solution to an optimization strategy algorithm, which will be discussed in greater detail below. To reduce overhead, the number of iterations per virtual machine 112 instantiation is set to a predefined number so that the work is distributed over multiple executions of the program. The on-line optimization strategies 304 become more refined as the number of program executions increases.

Additionally, the on-line optimization strategies 304 do not need to be updated after every execution of the virtual machine 112, thereby further reducing the amount of over occurring while the virtual machine 112 is running. The virtual machine 112 can also remember the point where it last left off during data profile analysis so that it does not need to restart the data profile analysis, thereby reducing the amount of overhead.

Figure 8:
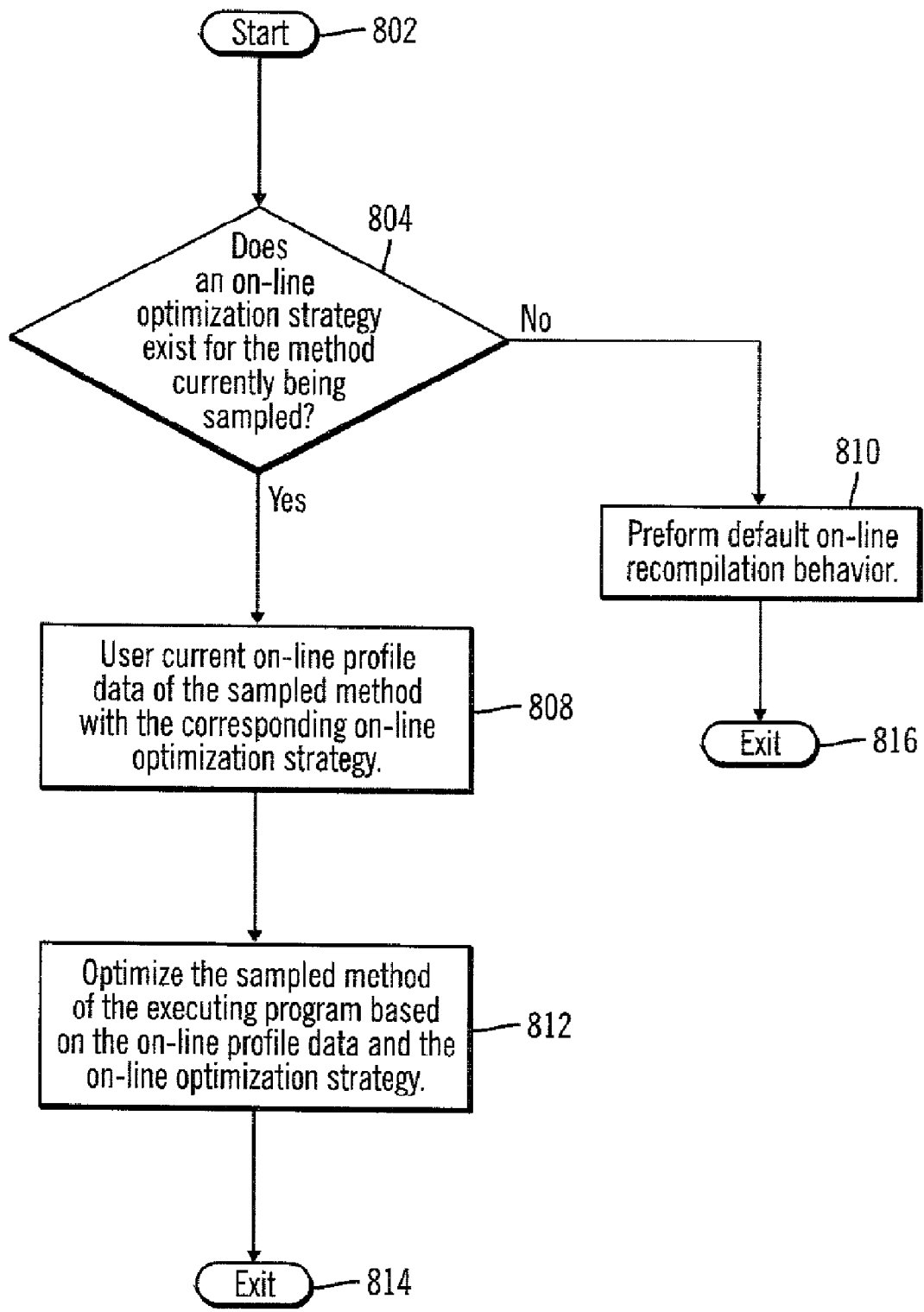
FIG. 8 is an operational flow diagram illustrating a process of improving performance and optimizing a program based on a combination of on-line and off-line profile data.

FIG. 8 is an operational flow diagram showing the process of optimizing a program. FIG. 8 shows how a program is optimized based on a combination of current on-line profile data and profile data 302 from prior runs of the program. The operational flow diagram of FIG. 8 begins with step 802 and flows directly to step 804. A program, at step 804, begins execution. The system 100, at step 804, determines whether an on-line optimization strategy 304 exists for a method currently being sampled. If this determination is positive, the current on-line profile data for the sampled method is used, at step 808, with the on-line optimization strategy 304 to determine how to optimize the sampled method. The current on-line profile data, for example, is the current number of samples for the method. The performance of the sampled method is then improved (e.g. optimized), at step 812, based on this determination, step 808. For example, if the current number of samples of the method is three the method is optimized according to the on-line optimization strategy 304 for three samples of the method. The control flow then exits at step 814. Performance is improved, by, in one example, optimizing the method, and it can also be improved by many other ways such as is known by those of ordinary skill in the art in view of the present discussion; for example, improvement can be made to time or cpu performance, space usage (memory footprint, disk space, etc), network usage, hardware configuration, network topology, etc.

If the above determination at step 806 is negative, for example, because this was the first time the method was compiled, a default on-line recompilation behavior, at step 810, is performed. The default on-line recompilation behavior can be similar to the steps in FIG. 7, where the program is executed, and the profile data is collected so that an on-line optimization strategy 304 can be determined for the sampled method. When the method is sampled again, the steps of FIG. 8 will be repeated. The control flow then exits at step 816.

Another advantage of the present invention is that the steps of FIGS. 7 and 8 are not required to all be performed within a single instantiation of the virtual machine 112. For example, the virtual machine 112 can read and use the on-line optimization strategies 304 without later contributing back to the off-line profile data repository 114. Similarly, the virtual machine 112 can contribute back to the off-line profile data repository 114 without having read the on-line optimizing strategies or performing the profile data analysis.

Additionally, collecting profile data and storing that data in an off-line repository 114 ensures the integrity and security of the program's code. For example the Java language has specific security requirements and attaching profiling data or optimization directives to the Java byte code as annotations, as suggested by prior art, could breach the embedded security in the Java code. Also if the repository 114 becomes corrupted the system 100 can continue to perform using a implementing a different behavior and ignore the repository.

As optimization occurs, the distribution of time spent in the various methods of the program changes. Optimizing a method M reduces the amount of time it spends executing, which may cause a system to conclude that it no longer requires such a high level optimization. This effect can lead to poor optimization choices by the prior art, and oscillation in the optimization decisions over time.

Figure 9:
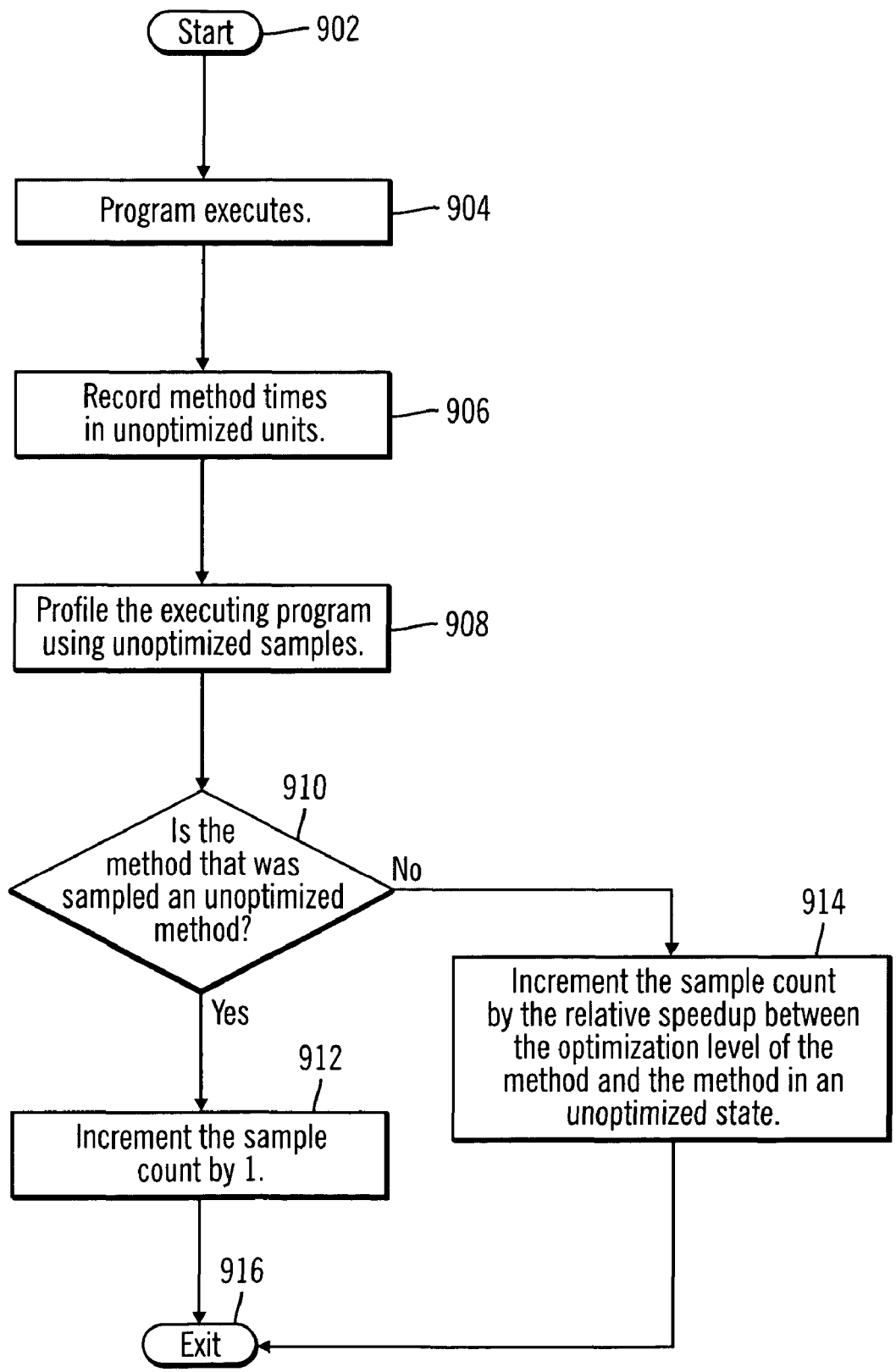
FIG. 9 is an operational flow diagram illustrating a process of accounting for the effects of optimization.

However, FIG. 9 shows how the present invention accounts for these effects. FIG. 9 is an operational flow diagram showing the process of accounting for the effects of optimization when further optimizing a program. The operational flow diagram of FIG. 9 begins with step 902 and flows directly to step 904. A program, at step 904, begins executing. All method times, at step 906, are recorded in unoptimized time units, which represent, for example, the amount of time the method would have executed if it had not been optimized. Because the present invention measures time using method samples, the time unit becomes unoptimized samples (the number of samples the method would have received if it had not been optimized).

The program is profiled (profile data is collected), at step 908, using unoptimized-samples. The samples are scaled as they occur at runtime. The system, at step 910, determines whether the method sampled is an unoptimized method. If this determination is positive, the sample count, at step 912, is incremented by 1 unit. If this determination is negative, an optimized method has been sampled and the sample count, at step 914, is incremented by the relative speedup between the optimization level of the method and the method in an unoptimized state. For example, assume that a method is optimized at level j and executes roughly 3 times faster than the method without being optimized, when the method compiled at level j is sampled, the sample count is incremented by 3 units, rather than 1 unit. The resulting sample count is an approximation of the sample count that would have occurred if the method had not been optimized. The control flow then exits at step 916. The above methodology allows profiles from multiple runs to be stored in a uniform fashion, regardless of what optimization occurred at runtime.

Additionally, If a method is to be optimized at some point during an execution, performing that optimization earlier is generally more beneficial because it will maximize the amount of execution that occurs in the optimized version of the method. However, delaying optimization also has advantages; for example, the optimizer has more information about the program available, such as knowing more about the program's class hierarchy, allowing speculative inlining decisions to be performed. Other examples include having more information about the sizes of types, such as the size of classes in the Java programming language, allowing more efficient code to be generated, for example, inclined allocation sequences. Therefore, sometimes delaying optimization is beneficial.

Figure 10:
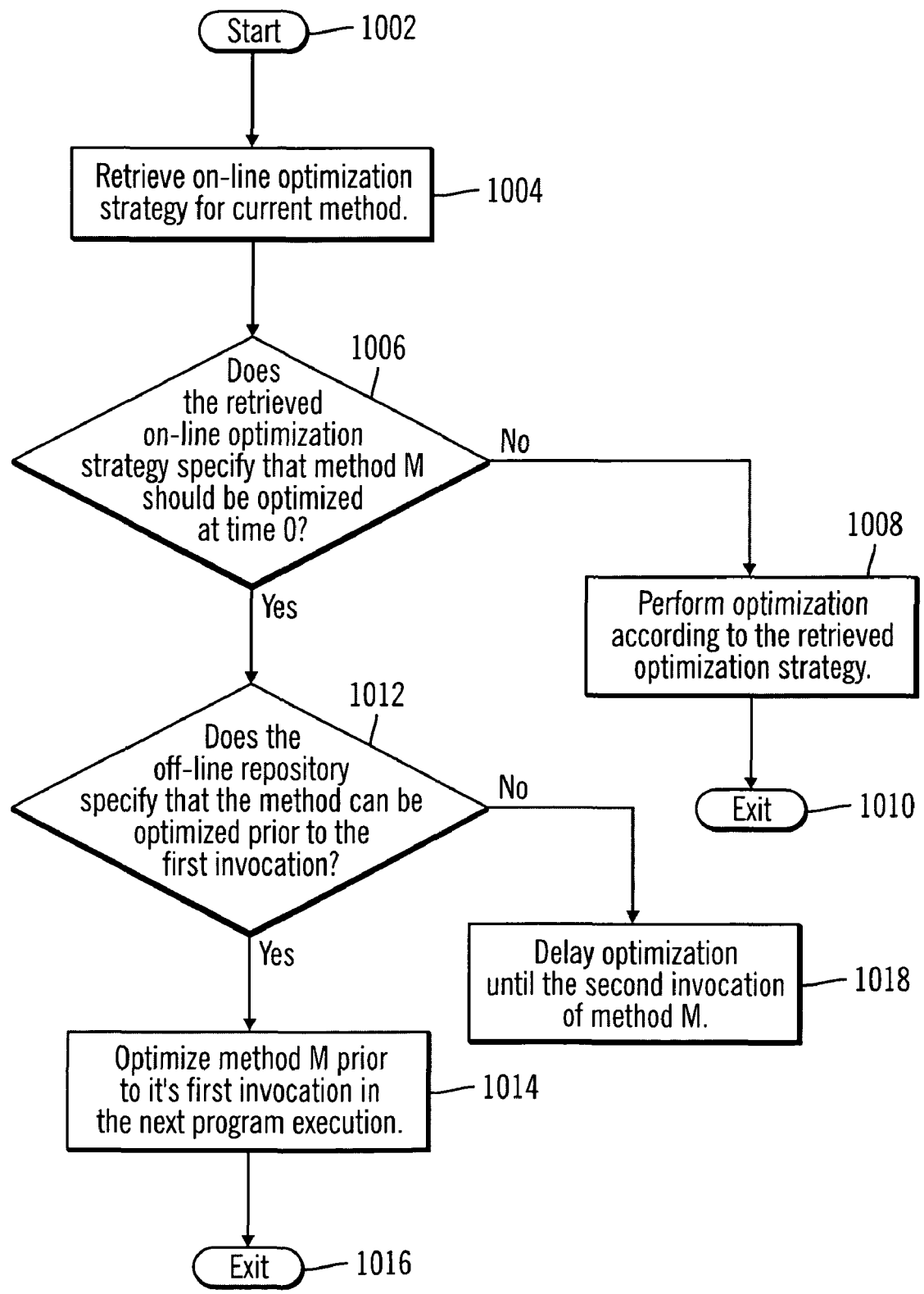
FIG. 10 is an operational flow diagram illustrating a process for optimizing a program utilizing early compilation.

The present invention harnesses the advantages of both situations where early and delayed optimization would be advantageous. FIG. 10 is an operational flow diagram showing a process for optimizing a program where the process utilizes the advantages of early compilation without giving up the advantages of delayed compilation. The operational flow diagram of FIG. 10 begins with step 1002 and flows directly to step 1004. The on-line optimization strategy 304 for a current method M is retrieved, at step 1004 from the off-line repository 114. The computer system 100, at step 1006, determines if the retrieved on-line optimization strategy 304 specifies that method M should be optimized at time 0 (before the method begins executing). If this determination is negative the optimization, at step 1008, is performed at the time specified in the on-line optimization strategy 304. The control flow then exits at step 1010. If this determination is positive, the computer system 100 then determines, at step 1012, whether the off-line repository 114 specifies that the method can be compiled prior to its first invocation.

If this determination is positive method M is optimized, at step 1014, prior to its first invocation in the next execution of its program. The decision of whether to optimize the method at time zero, or to delay, in one embodiment is made while analyzing the off-line repository 114 and creating the on-line strategies. In one embodiment, the decision whether to delay is determined by observing the number of unoptimized samples that were, for example, sampled while the interpreter is executing. Methods that have a large number of unoptimized samples ("large" depends on the sample rate of the virtual machine, for example, if samples are taken every 10 ms, more than 5 or 10 unoptimized samples is considered large) are long-running. Failing to optimize these methods prior to their first execution may result in the methods being stuck executing in the unoptimized version indefinitely if the system does not perform on-stack replacement. The control flow then exits at step 1016. If this determination is negative, the optimization of method M is delayed, at step 1018, until the second invocation of method M. For example, the first invocation of method M executes unoptimized, giving the virtual machine 112 time to see the method before it is optimized and gain many of the benefits of delayed compilation.

Figure 11:
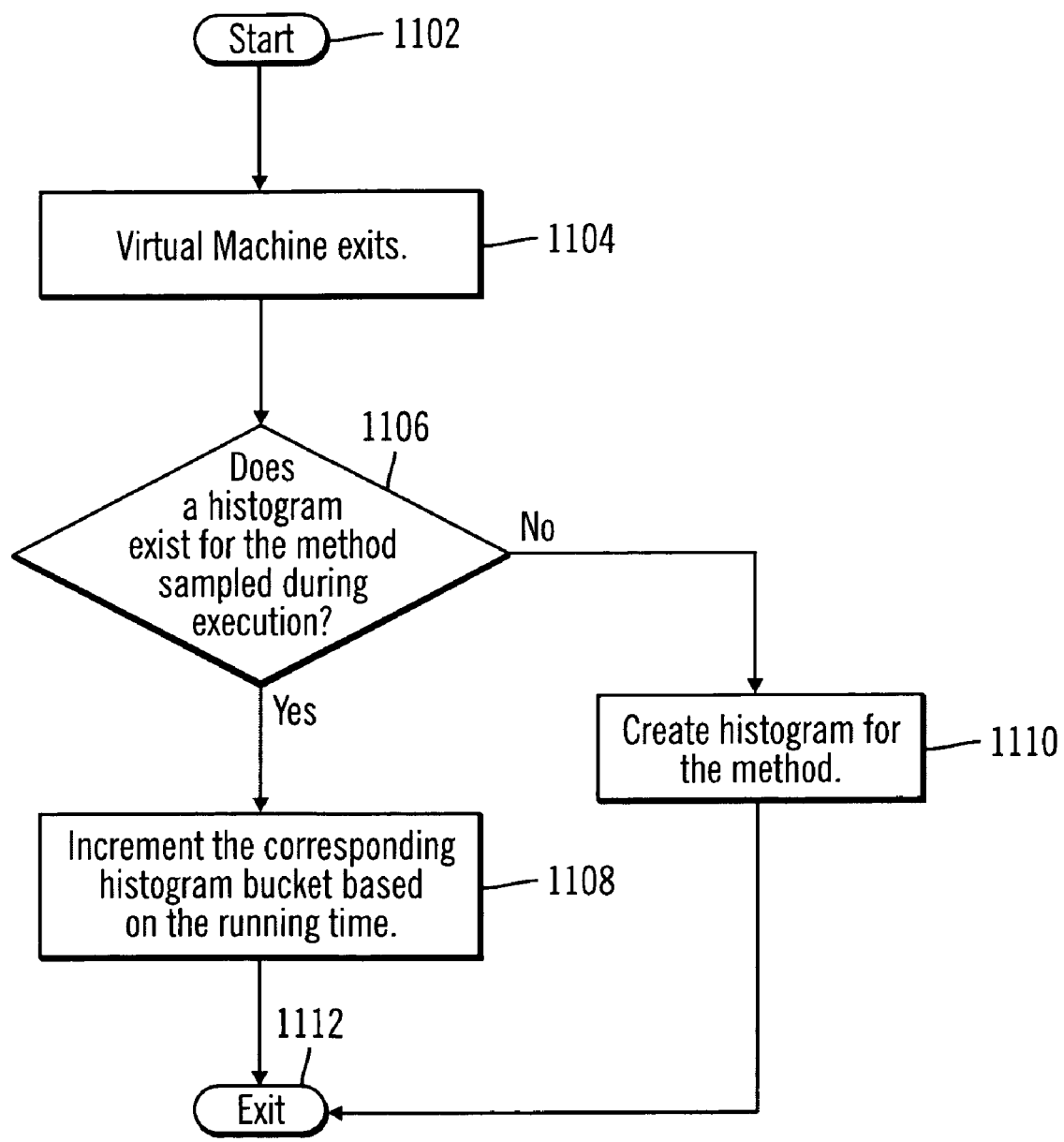
FIG. 11 is an operational flow diagram illustrating a process of updating the off-line repository.

FIG. 11 shows a process for updating the off-line repository 114, according to one embodiment of the present invention. The operational flow diagram of FIG. 11 begins with step 1102 and flows directly to step 1104. The virtual machine 112, at step 1104, exits from operation. The system 100 at step 1106 determines whether a histogram 500 exists for each method that was sampled during execution of a program in the virtual machine 112. If this determination is positive, the corresponding histogram bucket (not shown) is retrieved, at step 1108 and incremented depending on how long the method ran in the current execution. If this determination is negative, a histogram 500, at step 1110, is created for the method. The control flow then exits at step 1112. Also, for each method in the off-line repository 114 that was not sampled during the current execution, the histogram bucket for time zero (0) is incremented. The histogram bucket for time zero is incremented if the method actually executed at some point during execution, thereby allowing the system 100 to distinguish whether the method ran for a short amount of time or was never executed.

In one embodiment, multiple time values are mapped to the same histogram bucket as the value of T increases. This minimizes off-line repository 114 space and I/O time. Distinguishing the histogram values for consecutive times $T_i$ and $T_{i+1}$ is important for small values of i, but as i becomes large it is less significant to distinguish the histogram values. Therefore, a non-uniform bucket is used in the histogram 500. For example, the first N buckets correspond to a single time unit and after time N the bucket size increases polynomially to a maximum number of buckets. All samples that occur beyond the maximum bucket are recorded using the last bucket.

Additionally, in the embodiment above discussing the program entry 306 (FIG. 4), the preceding paragraphs discussing updating the off-line repository 114 also apply. For example, the system 100 determines whether an entry exists in the program entry 306 for the method sampled. If an entry does not exist one is created, if an entry does exist, that entry is incremented based on how long that method ran in the current execution.

FIG. 12 shows an optimizing algorithm 1200, according to one embodiment of the present invention, for constructing the on-line optimization strategies 304. The optimizing algorithm 1200 is for illustrative purposes only and does not limit the present invention to this particular algorithm. The optimizing algorithm 1200, for example, is a model based algorithm for constructing the on-line optimization strategies. The optimizing algorithm 1200 utilizes a performance model of the adaptive optimization system 214. When compiling a method M at optimization level L, the model can be used to estimate two quantities cost(M, L) and speedup(M, L). Cost (M, L) is the amount of compile time that will be consumed if the method is optimized at level. Speedup(M, L) is the performance gain of executing method M optimized at level L relative to method M in an unoptimized state. These quantities are estimated based on off-line performance measurements. The compile time cost is computed, for example, as a linear function of method size, based on the compilation rate (bytecodes/millisecond) of the byte code compiler 208 at level j. The speedup of each optimization level is a constant time-reduction factor relative to unoptimized code.

The optimizing algorithm 1200 constructs an online strategy R that maximizes some characteristic of overall performance. The choice of an objective function may vary depending on the desired performance goals for the system 100. For example, an object function that will maximize average performance if the history in the profile repository were to repeat itself is selected for a general purpose virtual machine. More formally, for a given method M, let $r_0, r_1 \ldots r_n$ represent the individual runs of method M recorded in the off-line repository 114. The optimizing algorithm 1200 selects a strategy R that minimizes:

$$\sum_{i=1\ldots n} \frac{R(r_i)}{unopt(r_i)}$$

where $R(r_i)$ and $unopt(r_i)$ represent the running time of the $r_i$ when executed using strategy R, and when executed unoptimized, respectively. Note that this optimization function is different than minimizing average running time, which would give more weight to longer running programs. By evaluating the performance relative to unoptimized code equal weight is given to all program executions recorded in the off-line repository 114, independent of their running times.

The optimizing algorithm 1200, for example, works on a single method at a time and uses a dynamic programming approach to compute a strategy that minimizes the objective function $$\sum_{i=1\ldots n} \frac{R(r_i)}{unopt(r_i)}$$

for a method M. The present invention, however, is not limited to using only the optimizing algorithm 1200 discussed above. In one embodiment, an optimizing algorithm that works on one or more methods at a time can be implemented, as should be obvious to those of ordinary skill in the art in view of the present discussion. With respect to the optimizing algorithm 1200, the running time of the optimizing algorithm 1200 is represented, for example, as $O(N*K^2)$ where N is the number of buckets in method M's profile distribution (histogram 500), and K is the number of optimization levels. K is expected to be a small constant, for example, K=4, thus the complexity is linear in the size of the histogram 500.

The optimizing algorithm 1200 begins at the end of time and walks backward. For the current point in time t, the algorithm asks the following question for each optimization level j: If method M is currently optimized at level j, what is the optimal strategy to take from time t forward? The optimal solution has already been computed for time t+1 (for all optimization levels), thus the optimizing algorithm 1200 needs to only consider the effects from time t to time t+1. The histogram 500 of method ending times is used to determine the number of program runs in which method M executes for at least t time units; performing compilation at time t costs (and benefits) only those runs.

When considering whether to optimize M at a higher optimization level h at time t, the algorithm considers three factors:
1. The cost of performing the compilation at time t. This cost affects only runs for which method M runs for at least t time units.
2. The benefit of executing for one time unit (from time t to time t+1) at level h, rather than level j. The algorithm credits this benefit only for runs where M runs for at least t+1 time units.1 Method M's execution time may be between time t and time t+1, but due to the profile granularity Method M's execution time may not be precisely known in some instances. When Method M's execution time is not precisely known, in one embodiment, an assumption can be made that optimization performed at time t does not benefit these executions. In an Alternative embodiment, the assumption can be made that on average the method executed for time t+0.5.
3. The benefit of being optimized at level h from time t+1 forward. This value was already computed in the previous iteration of the algorithm.

If moving from level j to level h at time t is better than staying at level j, then this compilation is recorded as part of the optimal strategy. The optimizing algorithm 1200 continues moving backward through time until time 0 is reached; the optimal strategy for a method that starts at optimization level of 0 (unoptimized) is reported.

The formal description of the optimizing algorithm 1200 according to one embodiment is as follows. Let runsExecutingM(t) represent the number of program runs that execute method M for t time units or more (computed from the profile histogram 500). Let j=0 . . . K represent the optimization levels of the optimization system 214, where level 0 represents unoptimized code. Let $C_j$ represent the compile time cost of M at optimization level j, and let $S_j$ represent the speedup of optimization level j relative to unoptimized code (for example, $S_j=0.5$ if optimization level j is twice as fast as unoptimized code). Variable Fj represents the optimal cost of executing the program from time t+1 forward, assuming method M was already optimized at level j; $Strat_j$ represents the strategy that achieves time $F_j$.

In one embodiment, the optimizing algorithm 1200 maximizes average performance only if future executions of the program occur as predicted by the profile repository 114. If a new input demonstrates radically different behavior from previous runs, the performance could be arbitrarily bad relative to the original system. For example, if method M is predicted to be long-running, the optimizing algorithm 1200 may select a strategy that optimizes M at a high level of optimization at time zero. This time spent compiling may lead to poor performance (relative to the original system) if a future input causes M to run for a short amount of time.

To ensure reasonable performance for unpredicted program inputs, in one embodiment, the optimizing algorithm 1200 is parameterized with a compilation bound. Given a compilation bound of X % the optimizing algorithm 1200 discards solutions that would increase compilation time by more than X % relative to the original system. In one embodiment, a small constant C (smoothing factor) is added to running times to enable calculations at time zero for ensuring compilation at time zero for any finite performance bound.

To construct optimizing strategies that meet the requirements of the compilation bound, the inner loop of the algorithm, in one embodiment, is modified as follows. Let BOUND be the compilation bound and C be the smoothing factor described above.

```
for each optimization level h such that h > j
    origComp = max compilation time that
    could be performed by original
    online system at time t
    budget = (origComp + ε) * (1 + BOUND)
    if (C_h > budget)
    // Skip C_h. Too expensive at time t
        continue;
    [remainder of original inner loop]
```

The foregoing embodiments of the present invention are particularly advantageous because they provide automatic optimization of a program. For example, the steps in FIGS. 6-10 are performed automatically without any interaction by a user and require no explicit training. The present invention runs transparently so that the user is not aware that the profiling and optimization is occurring. The embodiments of the present invention further enable the virtual machine 112 to exploit profiling data earlier in a program's execution and enables feedback-directed optimization over the life of the application rather than just a single execution. The profile data collected while a program executes persists across multiple runs of that program allowing the virtual machine to learn from these prior runs instead of starting from scratch every time the program executes.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, on an information processing system, for collecting and using profile information across multiple runs of an executing program, the method on an information processing unit comprising the steps of:
   executing at least one program in an execution environment;
   collecting on-line profile data during a run of the at least one program executing in the program execution environment in an on-line repository;
   collecting profile data, for the at least one program executing in the program execution environment across multiple previous runs thereof, in a persistent off-line repository where a histogram comprising a set of running durations and a number of executions at each duration in the set of running durations is maintained for each profiled at least one program to track the frequency with which certain profile results were observed, wherein the histogram is created from the profile data that has been collected across multiple runs of the at least one executing program;
   determining, without manual intervention, at least one on-line optimization strategy for the at least one executing program based on the histogram of collected profile data in the off-line repository; and
   improving performance of the at least one executing program based on the on-line profile data of the at least one executing program and the determined at least one on-line optimization strategy for the at least one executing program, wherein improving the performance includes at least optimizing a compilation process of at least one method of the executing program.

2. The method of claim 1, further comprising:
   storing the determined on-line optimization strategy in the off-line repository.

3. The method of claim 1, further comprising:
   determining whether an on-line optimization strategy exists for at least one component of the at least one executing program; and
   determining, based on a current number of samples for the at least one component of the executing program and a determined on-line strategy for the at least one component, a level of optimization to be performed on the at least one component.

4. The method of claim 1, wherein the improving performance comprises at least one of:
   optimizing cpu performance; and
   optimizing memory usage.

5. The method of claim 1, further comprising:
   updating the off-line repository after the executing program exits from a current run; and
   analyzing the collected profile data in the off-line repository for determining at least one on-line optimization strategy for updating into the off-line repository.

6. The method of claim 1, further comprising:
   incrementing a sample count by a predefined number associated with an un-optimized method that is sampled; and
   incrementing the sample count by a number corresponding to a relative speedup between a current optimization level of an optimized method and the optimized method in an un-optimized state.

7. The method of claim 1, wherein the collecting further comprises collecting profile data for at least one component of the at least one executing program across multiple runs.

8. The method of claim 1, wherein the improving performance further comprises:
   determining whether a method of the executing program is to be optimized at a predefined time; and
   delaying optimization of the method if the method is to be optimized at the predefined time until a predefined number of invocations of the method.

9. The method of claim 1, wherein the improving performance further comprises:
   determining whether a predefined number of un-optimized samples of a method of the executing program have occurred; and
   compiling the method prior to its first invocation in a subsequent execution if the predefined number of un-optimized samples occurs.

10. A system for collecting information for improving performance of an executing program, the system comprising:
    a persistent memory;
    an information processing unit communicatively coupled to the persistent memory;
    a program execution environment communicatively coupled to the persistent memory and the information processing unit;
    a profile data collector, communicatively coupled to the program execution environment, for collecting on-line profile data during a run of at least one program executing in the program execution environment;
    an on-line repository communicatively coupled to the profile data collector for storing the profile data collected during the run of the program executing in the program execution environment;
    a persistent off-line repository communicatively coupled to the profile data collector, the persistent off-line repository residing in the persistent memory, and persistently storing a set of profile data for the program executing in the program execution environment, wherein the set of profile data includes profile data that has been collected across multiple previous runs of the program, and where a histogram comprising a set of running durations and a number of executions at each duration in the set of running durations is maintained in the persistent off-line repository for each profiled executing program across multiple runs thereof to track the frequency with which certain profile results were observed, wherein the histogram is created from the profile data that has been collected across multiple previous runs of the at least one executing program;
    a profile data analyzer communicatively coupled to the off-line repository for analyzing the histogram of collected profile data in the off-line repository to determine, without user intervention, at least one on-line optimization strategy for the at least one executing program; and
    an optimizer communicatively coupled to the off-line repository and the on-line repository for improving performance of the at least one executing program based on on-line profile data of the at least one executing program and the determined at least one on-line optimization strategy for the at least one executing program, wherein improving the performance includes at least optimizing a compilation process of at least one method of the program.

11. The system of claim 10, wherein the program execution environment comprises at least one of:
   a virtual machine;
   JAVA virtual machine environment; and
   a middleware system.

12. The system of claim 10, wherein the profile data collector collects profile data associated with at least one method of the program executing in the program execution environment, and wherein the persistent off-line repository for persistently storing profile data associated with the at least one method and collected across multiple runs of the program executing in the program execution environment.

13. The system of claim 10, wherein the profile data analyzer analyzes the profile data stored in the persistent off-line repository and the profile data stored in the on-line repository to determine the at least one on-line optimization strategy for the program.

14. The system of claim 10, wherein the at least one on-line strategy comprises a set of tuples, each tuple corresponding to a method of a program and includes an optimization time and an optimization level.

15. A computer readable storage medium including computer instructions for collecting and using profile information across multiple runs of an executing program, the computer instructions comprising instructions for:
   executing at least one program in an execution environment;
   collecting on-line profile data during a run of the at least one program executing in the program execution environment in an on-line repository;
   collecting profile data, for the at least one program executing in the program execution environment across multiple previous runs thereof, in a persistent off-line repository where a histogram comprising a set of running durations and a number of executions at each duration in the set of running durations is maintained for each profiled at least one program to track the frequency with which certain profile results were observed, wherein the histogram is created from the profile data that has been collected across multiple runs of the at least one executing program;
   determining, without manual intervention, at least one on-line optimization strategy for the at least one executing program based on the histogram of collected profile data in the off-line repository; and
   improving performance of the at least one executing program based on the on-line profile data of the at least one executing program and the determined at least one on-line optimization strategy for the at least one executing program, wherein improving the performance includes at least optimizing a compilation process of at least one method of the executing program.

16. The computer readable storage medium of claim 15, further comprising instructions for:
   determining whether an on-line optimization strategy exists for at least one component of the at least one executing program; and
   determining, based on a current number of samples for the at least one component of the executing program and a determined on-line strategy for the at least one component, a level of optimization to be performed on the at least one component.

17. The computer readable storage medium of claim 15, further comprising instructions for:
   determining whether a method of the executing program is to be optimized at a predefined time; and
   delaying optimization of the method if the method is to be optimized at the predefined time until a predefined number of invocations of the method.

18. The computer readable storage medium of claim 15, further comprising instructions for:
   determining whether a predefined number of un-optimized samples of a method of the executing program have occurred; and
   compiling the method prior to its first invocation in a subsequent execution if the predefined number of un-optimized samples occurs.

* * * * *